(12) United States Patent
Xu et al.

(10) Patent No.: US 8,278,894 B2
(45) Date of Patent: Oct. 2, 2012

(54) DC-DC CONVERTER AND A METHOD FOR PRODUCING THE SAME

(75) Inventors: Shuang Xu, Shenzhen (CN); Weiwei Tang, Beijing (CN)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 12/634,540

(22) Filed: Dec. 9, 2009

(65) Prior Publication Data

US 2010/0244807 A1    Sep. 30, 2010

(30) Foreign Application Priority Data

Dec. 9, 2008 (CN) .......................... 2008 1 0182814

(51) Int. Cl.
*G05F 1/44* (2006.01)

(52) U.S. Cl. .................................................. 323/282

(58) Field of Classification Search ............... 323/272, 323/273, 282–284, 299, 351
See application file for complete search history.

(56) References Cited

U.S. PATENT DOCUMENTS

| | | | |
|---|---|---|---|
| 5,168,435 A * | 12/1992 | Kobayashi et al. ........... 363/20 |
| 5,717,320 A * | 2/1998 | Heeringa et al. ............. 323/282 |
| 7,596,006 B1 * | 9/2009 | Granat .............................. 363/39 |
| 8,030,908 B2 * | 10/2011 | Huang ......................... 323/237 |
| 2007/0195560 A1 * | 8/2007 | Yasumura .................. 363/21.01 |
| 2011/0101877 A1 * | 5/2011 | Zhan et al. ..................... 315/206 |

OTHER PUBLICATIONS

Lynch et al., "Under the Hood of Low-Voltage DC/DC Converters," Texas Instruments Incorporated, 2006.
Todd, "Snubber Circuits: Theory, Design and Application," Texas Instruments Incorporated, 2001.
Office Action from Chinese Patent Application No. 200810182814.6, dated Mar. 7, 2012.

* cited by examiner

*Primary Examiner* — Adolf Berhane
(74) *Attorney, Agent, or Firm* — Zilka-Kotab, PC

(57) ABSTRACT

A DC-DC converter adopted in a mobile device, for converting a DC input voltage to a DC output voltage is provided. The converter comprises an input circuit, a control circuit, and a switch. The input circuit is connected in series with a line for supplying the DC input voltage and includes a parallel connection of a first capacitor and a snubber circuit. The control circuit is provided for producing a control signal. The switch, connected with the input circuit, is adapted to turn ON or OFF in accordance with the control signal, so as to produce the DC output voltage.

20 Claims, 4 Drawing Sheets

DC-DC CONVERTER AND A METHOD FOR PRODUCING THE SAME

RELATED APPLICATION(S)

The present invention claims priority to Chinese Patent Application No. 200810182814.6, filed Dec. 9, 2008, which is hereby incorporated by reference.

FIELD OF INVENTION

The present invention relates to a DC to DC (, hereafter, DC-DC) converter which converts a given DC input voltage to a desired DC output voltage for supplying an electric load, by means of a switching control of a switch. The converter is particularly adapted to reduce the drop of the oscillating input voltage.

BACKGROUND OF THE INVENTION

Generally, a DC-DC converter utilizing a switching operation, e.g., by means of a Pulse-Width Modulation (PWM) control of a switching element such as a transistor has a relatively small size, and therefore can be embodied in an integrated circuit (IC). In addition, an inductor-capacitor (or L-C) filter is usually utilized as circuit components in order to achieve the averaging of the circuit in the DC-DC converter.

FIG. 1a shows a conventional example of a DC-DC converter with a PWM control circuit. The DC-DC converter 10 converts a DC input voltage Vin into another DC output voltage Vout. DC-DC converter 10 has a PWM control circuit 12 to turn ON and OFF the switch 14, e.g., a MOSFET. The averaging circuit 16, e.g., an L-C filter, then smoothes the node voltage Vsn, which is in a PWM waveform, to result in the steady DC output voltage Vout. The converter 10 also has an input capacitor 17. Since the current delivered to the converter 10 is an average DC current and the current in the switch 14 is pulsating, the input capacitor 17 is placed at the input of the converter 10 to average the input current. The input capacitor 17 provides a low-impedance voltage source for the converter 10 and helps to filter the pulsating current and to avoid the electromagnetic interference (EMI). For a detailed description of the converter 10, reference is made to Lynch and Hesse, *Under the Hood of Low-Voltage DC/DC Converters*, Texas Instruments Power Supply Design Seminar, SEM-1500, (SLUP184) (hereafter, referred as Lynch and Hesse).

When the switch 14 is turned ON and OFF in response to the PWN control signal of the circuit 12, the node voltage Vsn will rise or fall accordingly. But in practice, the DC input voltage Vin will be inevitably affected by the operation of the switch 14 and has some oscillations at switching moments. Particularly, as shown FIG. 1b, turning OFF of the switch 14 results in more noticeable oscillations (or so-called "rings"), which may have negative impacts back on the source of the DC input voltage which may supply to other devices at the same time. Typically, the system, like an electronic device, allows DC input voltage vary in a range. However, it will be a problem if the downside of the oscillating input voltage is lower than the minimum of the range.

Note that Lynch and Hesse make a reference that the rings of the node voltage rising could be controlled by a snubber circuit. For a description of the snubber circuit, reference is made to Philip Todd, *Snubber Circuits: Theory, Design, and Application*, SEM-900 Unitrode Power Supply Design Seminar, 1994. Topic II, TI Literature No. SLUP100. However, Lynch and Hesse have not discussed the rings of the input voltage. Nor have they suggested adopting a snubber circuit to reduce the rings of the input voltage.

SUMMARY OF THE INVENTION

The present invention is to provide a DC-DC converter for use in a mobile device and a method for producing the same. One aspect of the present invention is to reduce the quality factor of the input circuit. Another aspect of the present invention is to dampen the oscillations of the DC input voltage when the switch is turned ON and OFF. Still another aspect of the present invention is to control the drop or the downside of the DC input voltage. Yet another aspect of the present invention is to incorporate a snubber circuit connected in parallel with a capacitor in the input circuit.

In one embodiment, disclosed is a DC-DC converter for converting a DC input voltage to a DC output voltage. The converter comprises an input circuit, a control circuit, and a switch. The input circuit is connected in series with a line for supplying the DC input voltage and includes a parallel connection of a first capacitor and a snubber circuit. The control circuit is provided for producing a control signal. The switch, connected with the input circuit, is adapted to turn ON or OFF in accordance with the control signal, so as to produce the DC output voltage.

In another embodiment, disclosed is a mobile device incorporating the DC-DC converter described above.

Also disclosed is a method for producing the DC-DC converter described above. The method includes adjusting the quality factor of the input circuit by selecting the snubber circuit, to make the drop of the oscillating input voltage not to exceed a predetermined percentage when the switch is turned ON or OFF.

The foregoing and other features of the invention will be apparent from the following more particular description of embodiment of the invention.

BRIEF DESCRIPTION OF THE DRAWINGS

The present invention is illustrated by way of example and not intended to be limited by the figures of the accompanying drawings, in which like notations indicate similar elements.

DETAILED DESCRIPTION

The present invention of a DC-DC converter for use with a mobile device, a computer system or similar products will now be described with reference to the accompanying drawings. It is appreciated that that, those skilled in the art can understand can practice present invention embodied in other different forms and should not be construed as limited to the embodiments set forth herein.

Figure 1A:
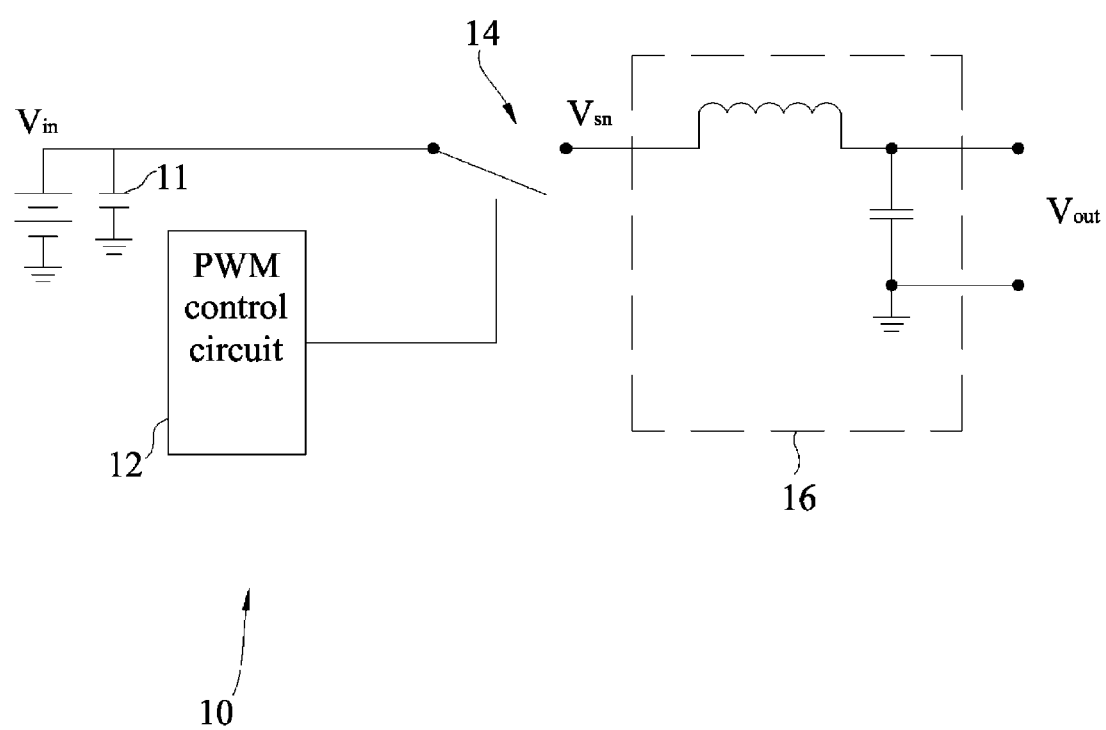
FIG. 1a illustrates a conventional DC-DC converter.
Figure 1B:
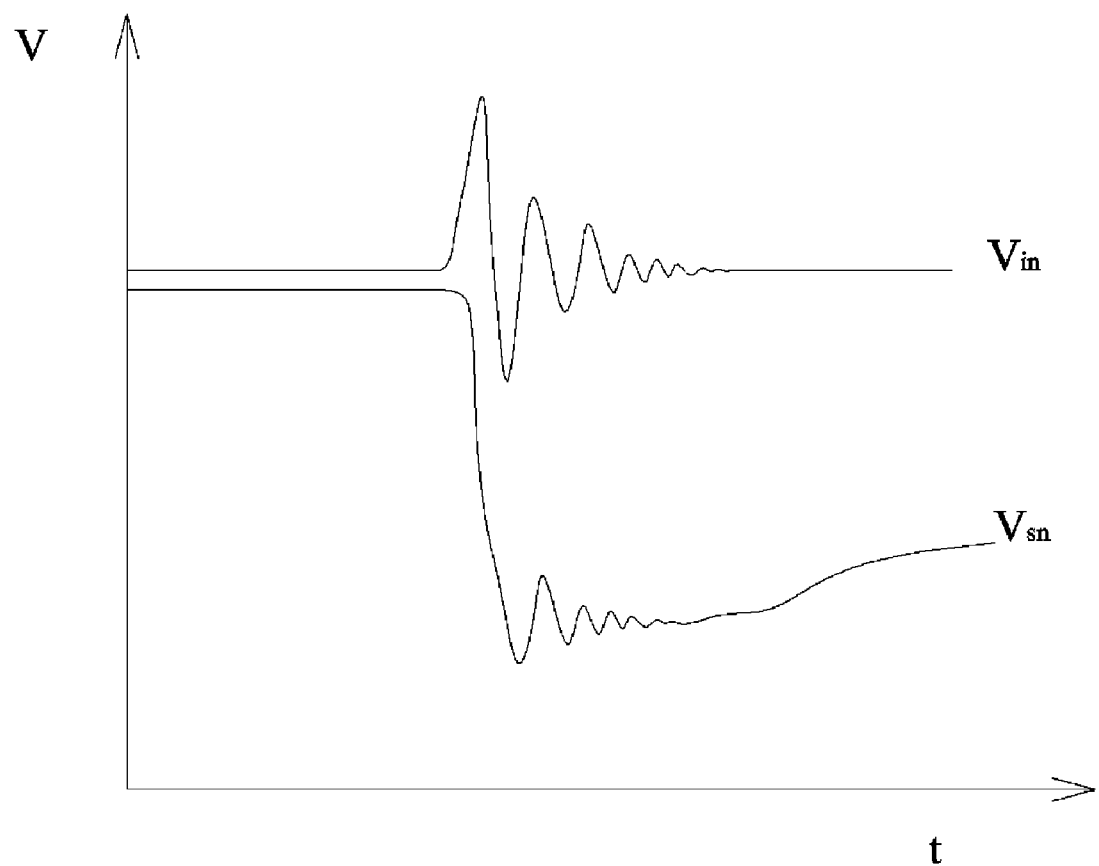
FIG. 1b shows that DC input voltage will start to oscillate when the switch is turned OFF.
Figure 2A:
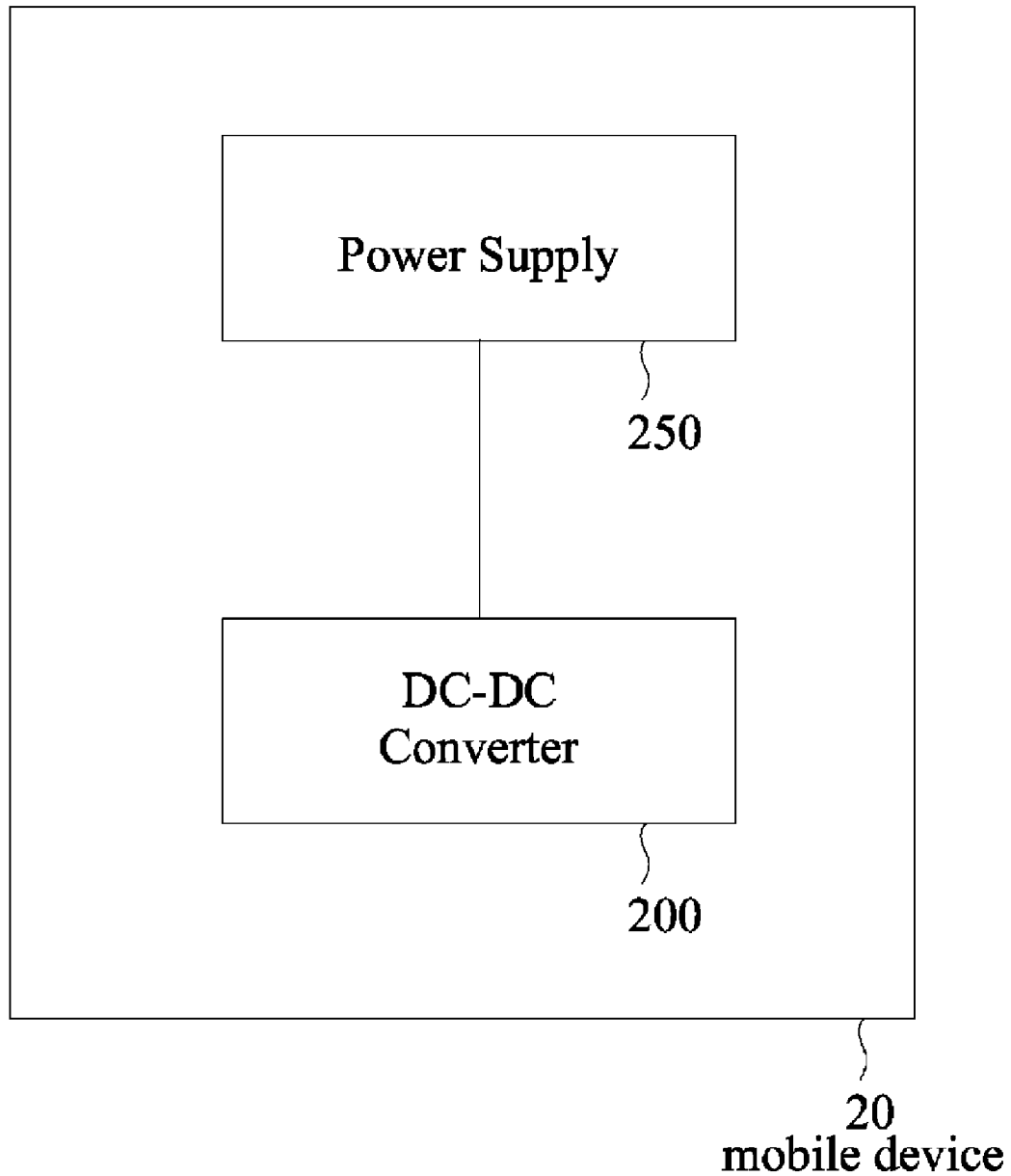
FIG. 2a illustrates a mobile device according to an embodiment of the present invention.

FIG. 2a is a diagram of mobile device 20 with a DC-DC converter 200 according to an embodiment of the present invention. The mobile device 20 can be a mobile phone, a personal digital assistant (PDA), a laptop computer, a car media player, a portable video player, a digital camera, a global positioning system (GPS), an avionics display, etc. In an embodiment, the mobile device 20 has a graphic card connected to a motherboard (both not shown), and the DC- DC converter 200 is incorporated into the graphic card to supply the DC output voltage to a graphic processing unit (GPU not shown), for manipulating and displaying computer graphics. In another embodiment, the DC-DC converter 200 may be directly disposed and integrated on the motherboard to supply the GPU. Preferably, the mobile device 20 adopts Mobile PCI Express Module (MXM), which is standard interface defined between PC systems and graphics subsystems. Then the DC-DC converter 200 is embodied on the MXM board for converting the DC input voltage of 7.5V-22V, supplied from the power supply 250 of the mobile device 20, to the DC output voltage of 1.1V for the GPU of NVIDIA Geforce series, for example. When the mobile device 20 is a laptop or notebook computer, for example, the power supply 250 may be a rechargeable battery, such as a nickel metal hydride ("NiMH") or lithium ion battery, and the value of the DC input voltage depends the usage of the battery 250.

Figure 2B:
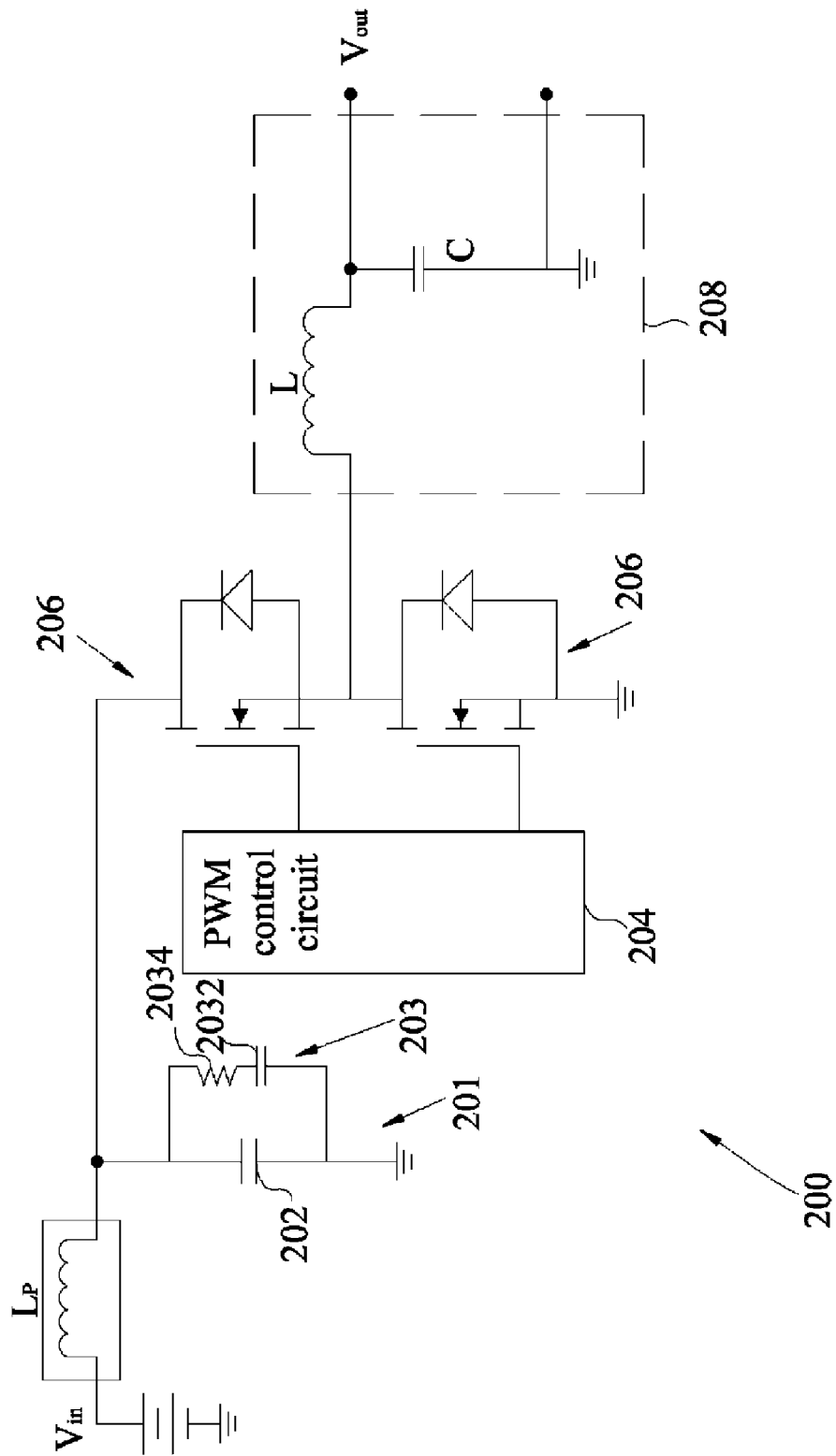
FIG. 2b illustrates a DC-DC converter according to another embodiment of the present invention.

FIG. 2b illustrates the DC-DC converter 200 according to an embodiment of the present invention. The converter 200 includes an input circuit 201, a control circuit 204, and at least a switch 206. The switch 206 could be a MOSFET switch, and the control circuit 204 is preferably a PWM control circuit for producing a PWM control signal to control the ON/OFF ratio (known as the duty cycle) of the semiconductor switch 206. The switch 206, connected with the input circuit 201, is adapted to turn ON or OFF in accordance with the control signal, so as to produce the output DC voltage Vout. Note that in practice, the converter 200 may have a number of the switches 206, connected with and controlled by the control circuit 204. For example, FIG. 2b shows a pair of upper and lower switches 206. The operation of the switch(es) 206 together with the control circuit 204 is similar to those in a conventional PWM-controlled DC-DC converter, and the details of them are omitted hereinafter.

As known to those skilled in the art, the voltage outputted from the switch 206 will be in a form of ripples and has some noises, whereas the frequency of the ripples may be at about 100 KHz, close to the switching frequency. Therefore, the averaging circuit 208 is preferably provided to average or smooth out the oscillating voltage to produce a steady DC output voltage Vout. An example for averaging circuit 208 could be a simply L-C filter, where the inductor is connected in series with a capacitor.

It is preferred that the input circuit 201 includes a capacitor 202 and a snubber circuit 203 parallel connected to the capacitor 202. Particularly, the quality factor (or Q factor) of the parallel connection of the capacitor 202 and the snubber circuit 203 would be lower than the quality factor of the capacitor 202 alone. By this arrangement, the input circuit 201 may replace the conventional input capacitor in order to provide the pulse current when the upper switch 206 is turned ON in the illustrated embodiment. More important, the rings of the DC input voltage Vin is further limited because the snubber circuit 203 consumes the energy contained in the rings, so that DC input voltage Vin will neither oscillate too much nor will be brought to a level lower than the system requirement of the device 20. Preferably, the snubber circuit 203 is designed to consume the energy of the high-frequency rings, for example, at 100 MHz.

In physics and engineering the quality factor is a dimensionless parameter that compares the time constant for decay of an oscillating physical system's amplitude to its oscillation period. The higher the Q factor, the lower the rate of energy dissipation relative to the oscillation frequency, so the oscillations die out more slowly. For an electrically resonant system, generally the Q factor depends on the resistance, inductance, and capacitance of the circuit in accordance with the following relationship: in a series RLC circuit, $$Q = \frac{1}{R}\sqrt{\frac{L}{C}};$$

in a parallel RLC circuit, $$Q = R\sqrt{\frac{C}{L}}.$$

In one embodiment, the snubber circuit 203 is simply an electrolytic capacitor with a large equivalent series resistances (ESR) (not shown). In a preferred embodiment, the snubber circuit 203 includes a capacitor 2032 connected in series with a resistor 2034. Both capacitor 2032 and 202 are Multilayer Ceramic Capacitors (MLCC), which are generally adopted in the integrated circuits because of their small sizes. A capacitor having a low ESR will keep the Q factor high. Therefore, in the snubber circuit 203, the capacitor 2032 is coupled with the resistor 2034 having a large resistance in order to lower the Q factor. This embodiment is particularly useful when the converter 200 is disposed in an MXM board, where electrolytic capacitors cannot be used.

During the producing process of the DC-DC converter 200, the production engineer will consider the practical characteristics of the mobile device 20 to determine the proper Q factor of the input circuit 201 or of the snubber circuit 203. For example, the production engineer will take into account the DC input voltage Vin, the input parasitic inductance Lp, the operating frequency of the switch 206, the parasitic inductance of the switch 206, the capacitance of the capacitor 202, etc., into consideration. In one example, for a converter 200 on a MXM board, when the DC input voltage is about 7.5 V and the capacitance of the capacitor 202 is about 100 μF, the capacitance of the capacitor 2032 is in the range of 100-10000 pF, and the resistance of the resistor 2034 is in the range of 1-10 ohm but preferably about 2.2 ohm.

By selecting the snubber circuit 203 (or selecting the capacitor 2032 and the resistor 2034) to have a desired quality factor, the rings of the input voltage Vin will be dampened. Particularly, the drop of the oscillating input voltage Vin could be controlled not to exceed a predetermined percentage, e.g., 10%, when the upper switch 206 is turned OFF.

After the snubber circuit 203 is selected, it will be embedded into the DC-DC converter 200. When the snubber circuit 203 has the capacitor 2032 coupled with the resistor 2034 as described above, preferably they are first packaged together and then integrated into the converter 200, via surface mount technology, for example. This approach will save assembly time and the cost.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A DC-DC converter for converting a DC input voltage to a DC output voltage, comprising:
an input circuit connected with a line for supplying said DC input voltage and said input circuit comprising a parallel connection of a first capacitor and a snubber circuit;
a control circuit for producing a control signal; and
a switch connected directly with said input circuit and adapted to turn ON or OFF in accordance with said control signal, so as to produce said DC output voltage;
wherein the quality factor of said parallel connection is lower than the quality factor of said first capacitor.

2. A converter according to claim 1, wherein said snubber circuit comprises a second capacitor connected in series with a resistor.

3. A converter according to claim 2, wherein said second capacitor and said resistor are packaged and embedded together into said converter.

4. A converter according to claim 2, wherein said second capacitor is adopted as a Multilayer Ceramic Capacitor.

5. A converter according to claim 2, wherein the capacitance of said first capacitor is about 100 μF, the capacitance of said second capacitor is in the range of 100-10000 pF, and the resistance of said resistor is in the range of 1-10 ohm.

6. A converter according to claim 5, wherein said DC input voltage is about 7.5 V.

7. A converter according to claim 6, wherein the capacitance of said first capacitor is approximately 100 μF, the capacitance of said second capacitor is approximately 1000 pF, and the resistance of said resistor is about 2.2 ohm.

8. A mobile device, comprising a DC-DC converter according any one of claims 1 to 7.

9. A method for producing a DC-DC converter for converting a DC input voltage to a DC output voltage, said DC-DC converter comprising a switch and a control circuit for producing a control signal to said switch, said method comprising:
providing an input circuit connected with a line for supplying said DC input voltage, said input circuit having a parallel connection of a first capacitor and a snubber circuit;
connecting said switch directly with said input circuit, wherein said switch is adapted to turn ON or OFF in accordance with said control signal to produce said DC output voltage;
adjusting the quality factor of said input circuit by selecting said snubber circuit, to make the drop of said input voltage not to exceed a predetermined percentage when said switch is turned OFF; and
embedding said selected snubber circuit into said input circuit.

10. A method according to claim 9, wherein said predetermined percentage is about 10 %.

11. A method according to claim 9, wherein the step of providing said input circuit further comprises: providing a second capacitor connected in series with a resistor in said snubber circuit 12. A method according to claim 11, wherein the step of embedding said selected snubber circuit further comprises packaging said second capacitor and said resistor together and integrating them into said input circuit.

13. A method according to claim 11, wherein the step of providing said second capacitor further comprises adopting a Multilayer Ceramic Capacitor as said second capacitor.

14. A method according to claim 11, wherein the capacitance of said first capacitor is about 100 μF, the capacitance of said second capacitor is in the range of 100-10000 pF, and the resistance of said resistor is in the range of 1-10 ohm.

15. A method according to claim 14, wherein said DC input voltage is about 7.5 V 16. A method according to claim 15, wherein the capacitance of said first capacitor is approximately 100 μF, the capacitance of said second capacitor is approximately 1000 pF, and the resistance of said resistor is about 2.2 ohm.

17. A converter according to claim 1, wherein said snubber circuit of said input circuit is connected directly to said switch.

18. A converter according to claim 1, wherein said switch outputs said produced DC output voltage to an averaging circuit.

19. A converter according to claim 1, wherein said switch and at least one additional switch are connected in parallel directly with said input circuit.

20. A converter according to claim 1, wherein said quality factor of said parallel connection is lower than said quality factor of said first capacitor such that said input circuit replaces an input capacitor in order to provide a pulse current when said switch is turned ON, and such that said snubber circuit consumes energy contained in rings of said DC input voltage to avoid at least some oscillation in said DC input voltage and to avoid a level of said DC input voltage going below a system requirement of a device having the DC-DC converter.

* * * * *